United States Patent [19]

Johnson

[11] 4,102,836

[45] Jul. 25, 1978

[54] WATER-DISPERSIBLE OLEORESINOUS PAINT BINDERS

[75] Inventor: Norman Walter Johnson, Orpington, England

[73] Assignee: Coates Brothers & Co., Ltd., London, England

[21] Appl. No.: 785,566

[22] Filed: Apr. 7, 1977

[30] Foreign Application Priority Data

Apr. 7, 1976 [GB] United Kingdom ............... 14125/76

[51] Int. Cl.$^2$ .......................... C09D 3/64; C09D 3/72
[52] U.S. Cl. .............................. 260/22 TN; 260/22 M; 260/29.2 E; 260/29.2 TN; 260/33.6 UB
[58] Field of Search .................. 260/22 TN, 29.2 TN, 260/22 M, 29.2 E, 33.6 UB

[56] References Cited

U.S. PATENT DOCUMENTS

| | | | |
|---|---|---|---|
| 2,634,245 | 4/1953 | Arndt | 260/22 T |
| 3,349,049 | 10/1967 | Seiwert et al. | 260/22 TN |
| 3,437,500 | 4/1969 | Hennig et al. | 260/22 TN |
| 3,437,624 | 4/1969 | Dawn et al. | 260/29.2 TN |
| 3,442,835 | 5/1969 | Curtice et al. | 260/22 M |
| 3,491,050 | 1/1970 | Keberle et al. | 260/29.2 TN |
| 3,752,778 | 8/1973 | Dhein et al. | 260/22 TN |
| 3,804,787 | 4/1974 | Nicks et al. | 260/22 CB |
| 3,920,595 | 11/1975 | Anderson et al. | 260/22 TN |
| 3,926,875 | 12/1975 | Tsugukuni et al. | 260/22 TN |
| 4,026,850 | 5/1977 | Frank et al. | 260/22 TN |

FOREIGN PATENT DOCUMENTS

845,861    8/1960    United Kingdom ............ 260/22 CB

*Primary Examiner*—Ronald W. Griffin
*Attorney, Agent, or Firm*—Marn & Jangarathis

[57] ABSTRACT

A process for the preparation of a water-dispersible oleoresinous film-forming material comprises reacting a first hydroxyl group-containing oleoresinous film-forming material with an organic diisocyanate in an amount such that the ratio of isocyanate groups in the diisocyanate to hydroxyl groups in the oleoresinous film-forming material is about 2:1 to produce an adduct containing free isocyanate groups and subsequently reacting the adduct with a second hydroxyl group-containing oleoresinous film-forming material to form a diadduct containing the first oleoresinous film-forming material and the second oleoresinous film-forming material, one of said first and second oleoresinous film-forming materials being a relatively hydrophilic oleoresinous film-forming material and the other being a relatively hydrophobic oleoresinous film-forming material and the relatively hydrophilic oleoresinous film-forming material forming a minor proportion by weight, preferably from 5 to 20% by weight, of the total of relatively hydrophobic and relatively hydrophilic oleoresinous film-forming materials. The diisocyanate is preferably one in which one isocyanate group has a markedly greater reactivity than the other, such as isophorone diisocyanate. The invention also consists in paint comprising the resultant water-dispensible film-forming materials dissolved in a solvent therefor.

6 Claims, No Drawings

WATER-DISPERSIBLE OLEORESINOUS PAINT BINDERS

This invention is concerned with improvements in and relating to the modification of relatively hydrophobic oleoresinous film-forming materials to render them more water-dispersible.

Oleoresinous film-forming materials are widely employed as film formers or binder resins in paint compositions, generally of the organic solvent based type. Thus, the great majority of oleoresinous film-forming materials employed in paint formulations are relatively hydrophobic and, consequently, it is necessary to clean the paint applicator with an organic solvent. It would clearly be desirable if such an oleoresinous films forming material could be provided with some increased degree of water dispersibility thereby rendering it possible to clean articles soiled therewith with, for example, water or an aqueous solution of a surface active agent.

It has now been found, in accordance with the present invention that the water-dispersibility of a hydroxyl group-containing, relatively hydrophobic oleoresinous film-forming material may be improved by linking it with a minor proportion, by weight, of a hydroxyl group-containing relatively hydrophilic oleoresinous film-forming material, by reaction with an organic diisocyanate.

The linking reaction may generally be carried out in one of two ways namely either by (a) reacting the hydroxyl group-containing relatively hydrophilic oleoresinous film-forming material (hereinafter referred to, for simplicity, as the hydrophilic film-former) with the organic diisocyanate to form an adduct containing free isocyanate groups and subsequently reacting this adduct with the hydroxyl group-containing relatively hydrophobic oleoresinous film-forming material (hereinafter referred to as the hydrophobic film-former), or (b) by reacting the hydrophobic film-former with the diisocyanate to form an adduct containing free isocyanate groups and subsequently reacting this adduct with the relatively hydrophilic film-former.

The term "relatively hydrophobic" as applied to the film-formers is intended to refer to a film-former which is not sufficiently water-dispersible either alone or in combination with conventional paint compounds, to be capable of being cleaned from a paint application by water or an aqueous solution of a synthetic detergent.

The preferred hydrophilic film-formers for use in accordance with the invetnion are hydrophilic alkyd resins containing polyoxyalkylene groups, for example as described in United Kingdom Patent Specification No. 845,861.

As indicated above, the process in accordance with the invention comprises firstly forming an adduct of the diisocyanate and the hydrophilic or hydrophobic film-former. This reaction may be carried out in a suitable solvent such as, for example, white spirit or may be carried by direct reaction (fusion) of the ingredients. The ratio of diisocyanate to film-former in the formation of the adduct is critical and the ratio of free isocyanate groups in the diisocyanate to free hydroxyl groups in the film-former should be about 2:1. If the ratio is markedly greater than 2:1 then, clearly, free diisocyanate will be present in the reaction medium and since this will commonly be reacted with the other film-former without isolation of the adduct the presence of such free diisocyanate molecules could lead to unwanted cross-linking of the other film-former. Conversely, if the ratio is markedly less than 2:1 there will be a tendency for cross-linkage of the first film-former (that is the one reacted with the diisocyanate) to occur. Accordingly the ratio of isocyanate groups to hydroxyl groups should, as indicated above, be substantially 2:1. It has also been found that in order to further reduce the possibility of cross-linking of the first film-former it is desirable to use an organic diisocyanate in which one isocyanate group has a markedly greater reactivity than the other. Thus, whilst virtually any organic diisocyanate, e.g. aryl or alkyl diisocyanate, may be used in accordance with the invention it is preferred to use diisocyanates in which, as indicated above, one group has a greater reactivity than the other and an example of such diisocyanates is isophorone diisocyanate. Other diisocyanates having dual reactivity are described in "Chemistry of Organic Film Formers", D. H. Soloman, Wineey, 1967, Chapter 8, page 205.

After formation of the adduct, it is reacted with the other film-former. The proportion in which the other film-former and the adduct are reacted should, or course, be such that the final product contains a minor proportion, by weight, of the hydrophilic film-former. A balance between detergent rinsability, film hardness and water resistance can be achieved by varying the amount of hydrophilic film-former. Levels of hydrophilic film-former below 5% fail to achieve significant improvement in rinsing characteristics; levels above 20% can cause a deterioration of water reistance in the dried film.

Also the balance of performance in respect of detergent rinsability and water resistance of the dried film can be adjusted by varying the molecular weight of the polyethylene glycol and its level in the hydrophilic film-former.

The preferred polyethylene glycol molecular weight lies between 400 and 1,500. Some loss of compatibility can be experienced with adducts based on polyethylene glycol having a molecular weight above 1,000(manifest as a cloudiness in the resins after the isocyanate reaction with the base alkyd).

Polypropylene glycols are less effective than polyethylene glycols. The other film-former should contain at least sufficient hydroxyl groups to react with all the isocyanate groups present in the adduct but may contain an excess of hydroxyl groups without any undue deleterious effect upon the properties of the resultant product. As indicated above, the reaction between the other film former and the adduct will commonly be carried out without isolating the adduct, i.e., by adding the other film-former to the reaction mixture produced by reacting the diisocyanate and the first film-former. It is preferred to carry out the second isocyanate reaction under the influence of a catalyst. Typically this may be dibutyl tin dilaurate. Other examples of suitable catalyst are listed by Solmon (page 209) indicating their catalytic activity.

The modified film-formers produced in accordance with the invention may be incorporated in paint systems comprising the film-former, an organic solvent system and generally one or more pigments. Suitable solvents for the formation of such paints include, for example, white spirit. Generally it is preferred to arrange that the reaction of the organic diisocyanate with the first film-former and the subsequent reaction of the adduct produced with the other film-former be carried out in a solvent suitable for incorporation in the paint itself, thereby eliminating the necessity to remove the modified film-former from the reaction solution.

Optionally the paints may also incorporate other components to modify their application or performance characteristics. For example they may be rendered thixotropic by the addition of minor proportion of commercially available thixotropic alkyds.

Other binders such as polyurethanes, vinylated or acrylated alkyds may be added in minor proportion to modify the performance characteristics of the paint (e.g. to improve the hardness, drying speed or water resistance of the film).

In order that the invention may be well understood the following Examples are given by way of illustration only.

In the Examples the isocyanate value is determined as follows.

A sample of resin is accurately weighed into each of two 250 ml Erlenmeyer flasks. To these and two empty flasks (for blank determination) are pippetted 25 ml dry toluene AR.

The sample in each of two flasks is dissolved and cooled to room temperature. 25 ml di-n-butylamine (2N in toluene) are pippetted into each of the four flasks, the contents swirled and allowed to stand at room temperature for 15 minutes.

100 ml isopropanol and 2 drops bromocresol green indicator are added to each flask and their content titrated with N/2 HCl to a green to yellow end point.

The isocyanate value is expressed as the number of mgKOH equivalent to the di-n-butylamine capable of combining by urea formation with 1 gram of sample.

EXAMPLE 1

(a) Preparation of relatively hydrophobic alkyd resin

A long oil soya alkyd was prepared as a 70% solution in white spirit from:

| Soya oil | 62.5 parts by weight |
|---|---|
| Pentaerythritol | 13.2 parts by weight |
| Lead acetate | 0.025 parts by weight |
| Phthalic Anhydride | 24.2 parts by weight |
| Xylol | 4.0 parts by weight |

The soya oil, pentaerythritol and lead acetate were heated to 240° C in a reaction vessel fitted with a stirrer, nitrogen inlet, thermometer and Dean and Stark entrainment distillation unit. A temperature of 240° C was held for 1 hour (by which time a hot, 3:1 by weight, mixture of the reactants with ethanol was a clear solution). The temperature was lowered to 200° C and phthalic anhydride and xylol added. The temperature was returned to 240° C and the reaction continued under entrainment distillation conditions until the viscosity of a 60% by weight solution of a sample of the reactants had risen to 3.1 stoke at 25° C (reaction time 5½ hours). By this time the acid value had fallen to 7.9 mg KOH/g. The product was cooled and thinned to 70% non volatile content with white spirit. This product had an acid value 7mgKOH/g, a hydroxyl value 40 mgKOH/g and a viscosity (70% in white spirit at 25° C) 13 stokes.

(b) Preparation of relatively hydrophilic alkyd resin

| Polyethylene glycol 600 | 3 mole |
|---|---|
| Glycerol | 0.33 mole |
| Trimellitic Anhydride | 1.00 mole |
| Tall Oil (Low rosin acid grade) | 3.00 mole |

The components were reacted together at 220° C for 4 hours to yield an alkyd with an acid value 8.8 mg KOH/g in a fusion process under a nitrogen atmosphere. The product was thinned to 80% non volatile content with white spirit.

(b) Reaction of relatively hydrophilic alkyd resin with isocyanate

The entire product of (b) above was heated to 45° C and 1 mole of isophorone diisocyanate added with stirring under a nitrogen atmosphere over a period of 15 minutes. The temperature was raised to 60° C and held for 3 hours until the isocyanate value had fallen to 21 by which time the acid value was 8.8 mg KOH/g. The product was thinned to 80% non volatile content with white spirit.

(d) Preparation of final water-rinsable alkyd

| Alkyd of example (a) | 1500.0 parts by weight |
|---|---|
| White spirit | 10.0 parts by weight |
| Dibutyl tin dilaurate | 0.34 parts by weight |
| Isocyanate adduct of (c) above | 146.0 parts by weight |

The alkyd and white spirit were heated to 50° C and the product of (C) above added. The temperature was raised to 90° C and the catalyst added. A temperature of 110° C was maintained for 3 hours by which time the isocyanate value of the reaction mixture had fallen to 0.7. The product was allowed to cool. The final modified alkyd had an acid value 7.8 mg KOH/g a viscosity 35 poise (25° C) and a non volatile content of 71%.

EXAMPLE 2

(a) Preparation of relatively hydrophilic resin

| PEG 600 | 0.51 mole |
|---|---|
| Glycerol | 0.774 mole |
| Rosin | 0.50 mole |
| Maleic Anhydride | 0.50 mole |
| Tall Oil (low rosin acid grade) | 1.27 mole |

The resin was heated with stirring under nitrogen to 100° C. The maleic anhydride was added, maintaining the temperature above 90° C and the temperature then raised to 200° C and maintained for 3 hours.

The remainder of the ingredients were then added and the mixture reacted together at 240° C under nitrogen by a fusion process until the acid value had fallen to 16 mg KOH/g (3 hours).

The product was thinned to 80% non-volatile content with white spirit. The product was cooled to 45° C and used in (b) below.

(b) Preparation of isocyanate adduct

The entire product of (a) above was reacted at 45° C with 0.53 moles isophorone diisocyanate according to the process of Example 1(c) but holding until an isocyanate value of 35 was reached (achieved after 3 hours reaction).

(b) Preparation of final water-rinsable alkyd

1500 Parts by weight of the product of Example 1(a) and 146 parts by weight of the isocyanate adduct of (b) above were reacted under the conditions described for Example 1(d).

EXAMPLE 3

Preparation of relatively hydrophilic resin

| PEG 600 | 0.51 mole |
|---|---|
| Dimer Acid | 1.16 mole |
| Phthalic Anhydride | 0.635 mole |

The components were fusion process reacted according to the procedure of Example 1(b). The product had an acid value 15.5 mg KOH/g and a non-volatile content of 80% by weight (in white spirit).

(b) Preparation of isocyanate adduct

The product of (a) above was reacted with 0.53 mole of toluene diisocyanate at 25° C adding te TDI over a 30 minute period and keeping the temperature below 30° C. The temperature was maintained in the range 25°-35° C for a total of 4 hours by which time the isocyanate value had fallen to 22.

(c) Production of final product

The product of (b) above was reacted with the alkyd from Example 1(a) according to the condition described in Example 1(d).

EXAMPLE 4

(a) Preparation of relatively hydrophilic alkyd resin

| PEG | 0.51 mole |
|---|---|
| Pentaerythritol | 0.58 mole |
| Phthalic Anhydride | 0.755 mole |
| Tall Oil | 1.27 mole |

The components were reacted according to the procedure of Example 1(b) the components being reacted together at 220° C for 3 hours. The product was thinned to 80% non-volatile content with white spirit and had an acid value of 17 mg KOH/g.

(b) Preparation of isocyanate adduct

The product of (a) above was reacted with 0.53 mole of isophorone diisocyante according to te procedure of Example 1(b) to yield an adduct having an isocyanate value of 35 after 2 hours reaction at 75° C.

(c) Preparation of final product

The product of (b) above was reacted with the alkyd of Example 1(a) accordng to the conditions described in Example 1(d).

EXAMPLE 5

Preparation of relatively hydrophilic alkyd resin

| PEG 600 | 0.255 mole |
|---|---|
| Hexylene glycol | 0.255 mole |
| Glycerol | 0.774 mole |
| Trimellitic anhydride | 0.51 mole |
| Tall oil | 1.27 mole |

The components were reacted together according to the procedure of Example 1 (b). The product had an acid value 20 mg KOH/g and was thinned to 80% non volatile content with white spirit.

(b) Preparation of isocyanate adduct

The product of (a) above was reacted with 0.53 moles isophorone diisocyanate according to the procedure of Example 1(c) yielding a product having an acid value of 20 mg KOH/g and an isocyanate value of 40.

(c) Preparation of final product

The product of (b) above was reacted with the alkyd of Example 1(a) according to the conditions described in Example 1 (d).

The final products from each of the above examples were each made into paints at a pigment: binder ratio of 0.75:1.0 using R-CR2 Titanium Dioxide on a triple roll mill. To each paint was added.

0.5% Pb metal as lead naphthenate
0.05% Co metal as cobalt naphthenate based on the solid resin content of the paint, together with 0.3% methyl ethyl ketoxime. Each paint was thinned to 4 poise (at 25° C) with white spirit.

Each paint was examined for water rinsability by the following test:

1. In turn a sample of each paint was brushed out using a new 1 inch brush working the paint right up to the ferrule.
2. Surplus paint was wiped from the bristles with a paper towel.
3. Each brush was allowed to dry for 15 minutes.
4. Each brush was immersed in 500 ml 1% liquid detergent* at 40° C and allowed to soak for 1 hr (allowing te slution to cool to room temperature).

*(Fairy liquid)

5. Each brush was then agitated for 45 secs in the solution and then removed from the solution.
6. Each brush was then rinsed with cold water for 15 secs and dried.

New brushes were used for each test and the condition of each brush classified according to an empirical scale after each test.

A — Excellent
B — Very Good
C — Good
D — Moderate
E — Poor
F — Unsatisfactory

The results from the five examples according to this test method were as follows:

| Paint from Example No. | Rating |
|---|---|
| 1(d) | A |
| 2(c) | B - C |
| 3(c) | A |
| 4(c) | C |
| 5(c) | C |

For comparison a paint was prepared and tested according to te above described procedure based on the unmodified base alkyd of Example 1(a). The brush was rated as E - F in the above test.

I claim:

1. A process for the preparation of a water-dispersible oleoresinous film-forming material which comprises reacting a first hydroxyl group-containing alkyd resin with an organic diisocyanate in an amount such that the ratio of isocyanate groups in the diisocyanate to hydroxyl groups in the alkyd resin is about 2:1, to produce an adduct containing free isocyanate groups and subsequently reacting the adduct with a second hydroxyl group-containing alkyd resin to form a diadduct containing the first alkyd resin and the second alkyd resin, in which one of said first and second alkyd resins is a relatively hydrophilic alkyd resin and the other is a relatively hydrophobic alkyd resin and in which the relatively hydrophilic alkyd resin forms a minor proportion by weight of the total of relatively hydrophobic and relatively hydrophilic alkyd resin.

2. A process as claimed in claim 1 in which the said organic diisocyanate is one in which one isocyanate group has a markedly greater reactivity than the other.

3. A process as claimed in claim 2 in which the organic diisocyanate is isophorone diisocyanate.

4. A process as claimed in claim 1 in which the hydrophilic alkyd resin forms from 5 to 20% by weight of the total weight of hydrophilic and hydrophobic alkyd resins.

5. An oleoresinous film-forming materials obtained by the process as claimed in claim 1.

6. A paint comprising the oleoresinous film-forming materials as claimed in claim 5 dissolved in a solvent therefor.

* * * * *